United States Patent
Thomas, Jr. et al.

(10) Patent No.: US 8,602,239 B2
(45) Date of Patent: Dec. 10, 2013

(54) DECORATIVE PAPER PLATE STORAGE UNITS

(76) Inventors: Robert L. Thomas, Jr., Jacksonville, AR (US); Veda Nan Thomas, Jacksonville, AR (US)

(*) Notice: Subject to any disclaimer, the term of this patent is extended or adjusted under 35 U.S.C. 154(b) by 9 days.

(21) Appl. No.: 12/806,519

(22) Filed: Aug. 16, 2010

(65) Prior Publication Data
US 2012/0037640 A1 Feb. 16, 2012

(51) Int. Cl.
*A47G 19/02* (2006.01)

(52) U.S. Cl.
USPC .................................................. 220/4.22

(58) Field of Classification Search
USPC ............... 220/483, 480, 476, 574, 628, 4.22, 220/4.23; 221/97, 98, 99, 100, 103; 211/50, 211/45, 10, 41.2; 312/326, 327, 329, 258
See application file for complete search history.

(56) References Cited

U.S. PATENT DOCUMENTS

| | | | | |
|---|---|---|---|---|
| 963,883 A * | 7/1910 | Farley | | 109/51 |
| 2,300,405 A * | 11/1942 | Cook | | 126/275 R |
| 3,090,271 A * | 5/1963 | Castelli | | 83/614 |
| 3,504,787 A * | 4/1970 | Brockway | | 206/570 |
| 4,484,692 A * | 11/1984 | Palermo et al. | | 220/3.8 |
| 5,050,767 A * | 9/1991 | Peer | | 220/480 |
| 5,054,418 A * | 10/1991 | Thompson et al. | | 118/500 |
| 5,096,056 A * | 3/1992 | Garcia | | 206/749 |
| 5,131,562 A * | 7/1992 | Brown | | 221/41 |
| 5,310,339 A * | 5/1994 | Ushikawa | | 432/253 |
| 5,328,052 A * | 7/1994 | Kizilos | | 221/42 |
| 5,671,951 A * | 9/1997 | Palmiter et al. | | 281/31 |
| 5,769,006 A * | 6/1998 | Allaer | | 109/73 |
| 5,865,321 A * | 2/1999 | Tomanovich | | 211/40 |
| 5,873,643 A * | 2/1999 | Burgess et al. | | 312/290 |
| 6,099,645 A * | 8/2000 | Easley et al. | | 118/500 |
| 6,105,782 A * | 8/2000 | Fujimori et al. | | 206/710 |
| 6,206,192 B1 * | 3/2001 | Winstead et al. | | 206/572 |
| 6,419,482 B1 * | 7/2002 | Sakata et al. | | 432/250 |
| 6,675,986 B1 * | 1/2004 | Spencer | | 221/98 |
| 6,776,289 B1 * | 8/2004 | Nyseth | | 206/711 |
| 6,988,631 B1 * | 1/2006 | Brothers | | 220/574 |
| 7,000,798 B2 * | 2/2006 | Gruennert et al. | | 220/495.09 |
| 7,131,609 B1 * | 11/2006 | Lewis et al. | | 242/593 |
| 2003/0062279 A1 * | 4/2003 | Lam | | 206/350 |
| 2003/0178324 A1 * | 9/2003 | Watson | | 206/6 |
| 2003/0230498 A1 * | 12/2003 | Maute | | 206/38 |
| 2004/0262315 A1 * | 12/2004 | Yoon | | 220/480 |
| 2006/0091147 A1 * | 5/2006 | Arndt | | 221/208 |
| 2006/0207916 A1 * | 9/2006 | Mimura et al. | | 206/710 |
| 2006/0231558 A1 * | 10/2006 | Gayman | | 220/476 |
| 2007/0108095 A1 * | 5/2007 | Burns et al. | | 206/710 |
| 2007/0131695 A1 * | 6/2007 | Hsing-Hsien | | 220/483 |
| 2007/0227941 A1 * | 10/2007 | Narita et al. | | 206/710 |
| 2008/0060205 A1 * | 3/2008 | Schmidt et al. | | 30/298.4 |
| 2009/0127160 A1 * | 5/2009 | Lin | | 206/710 |
| 2010/0051501 A1 * | 3/2010 | Corbin et al. | | 206/710 |
| 2010/0096280 A1 * | 4/2010 | Breitt et al. | | 206/6 |

* cited by examiner

*Primary Examiner* — Steven A. Reynolds
*Assistant Examiner* — King M Chu
(74) *Attorney, Agent, or Firm* — Richard Blakely Glasgow

(57) ABSTRACT

Paper Plates currently have no designated storage space built into any kitchen, craft, or workroom. The Plate-let gives decorative storage solutions for disposable dinnerware. This solution will give convenient storage solutions without having to create additional space in existing cabinets or drawers. The design and multiple mounting abilities give the Plate-let flexible usage possibilities.

4 Claims, 2 Drawing Sheets

DECORATIVE PAPER PLATE STORAGE UNITS

CROSS-REFERENCE TO RELATED APPLICATIONS

Technical Field

The present invention relates generally to decorative storage units and, in particular, to storage units that can house disposable dinnerware (paper plates) and utensils

BACKGROUND

Paper Plates are used by almost every household, but have no designated storage in most kitchens or anywhere they are used in private residences. Most paper plates are stored in a drawer or cabinet or just sitting out on the counter. There are know holders for paper plate products, but these just allow the user to strengthen the plate for usage and do not offer storage for the ware.

Accordingly, it can be seen that a decorative easily accessible storage unit for paper plates could be very useful in most households and anywhere paper plates are used in abundance.

SUMMARY

Generally described, the present invention relates to decorative storage units for paper plates. The basic design for the storage unit is circular or rounded in shape. However, there are variations on each unit to accommodate different storage needs. All units will have the ability to be mounted with brackets or held to a metallic surface with a magnetic strip attached to each unit. These units give the user an easy accessible way to store disposable dinnerware (paper plates) and utensils.

DETAILED DESCRIPTION OF INVENTION AND EXAMPLE EMBODIMENTS

The present invention relates to storage units designed specifically for disposable dinnerware (paper plates) and utensils. These units can be mounted under cabinetry in the kitchen area or on any metallic surface desired. This storage unit gives easy accessibility and decorative storage for disposable dinnerware (paper plates) and utensils that usually have no designated storage area.

Figure 1:
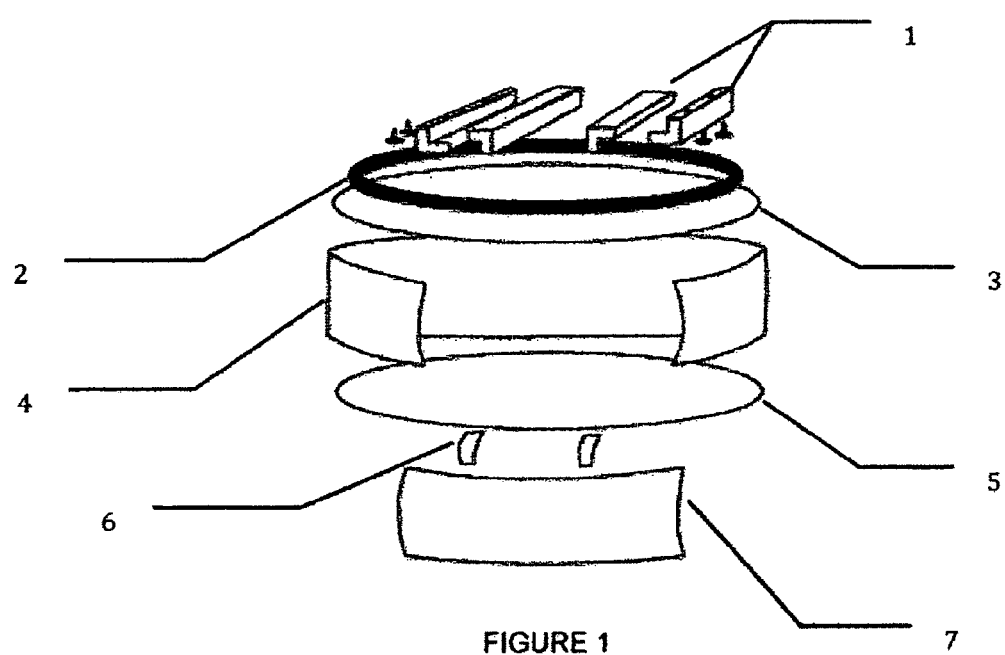
FIG. 1 is a perspective view of a paper plate storage unit shown in deconstructed view.

FIG. 1. shows a deconstructed view of the paper plate storage unit

Figure 2:
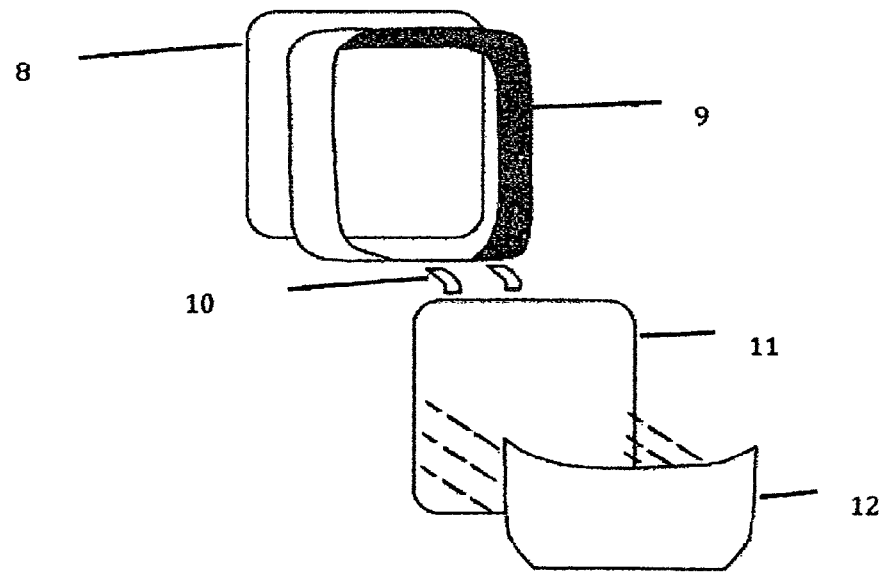
FIG. 2. Is a perspective view of a paper plate storage unit according to a first example embodiment of the present invention, showing the unit in deconstructed view.

1. User installed brackets
2. Magnetic Ring used for holding unit to metallic surfaces
3. Top of unit
4. Sides of unit
5. Bottom of unit
6. Door hinges used to attach door to assembled unit
7. Unit Door FIG. 2 shows a deconstructed view of example 2 of our paper plate storage unit according to a first example embodiment of the present invention.

8. Unit Back, holds magnetic Strip and area for 2 sided tape to be applied for mounting
9. Sides of unit
10. Door hinges used to attach door to assembled unit
11. Door or front of unit
12. Plate Pocket attached to unit door for the specific purpose of holding paper plates.

Figure 3:
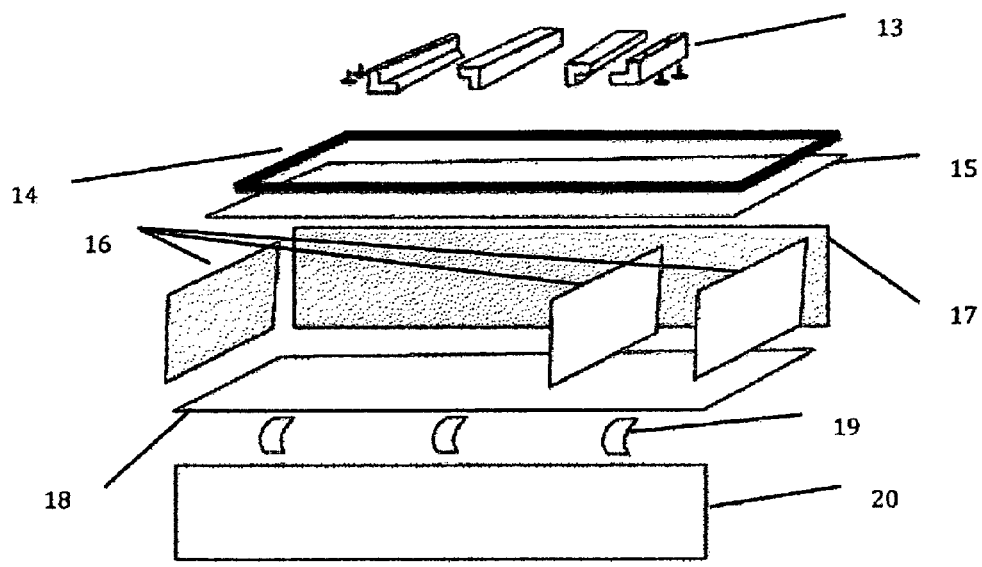
FIG. 3. Is a perspective view of a paper plate storage unit according to a second example embodiment of the present invention, showing the unit in deconstructed view.

FIG. 3. shows a deconstructed view of example 3 of our paper plate storage unit according to a first example embodiment of the present invention.

Figure 4:
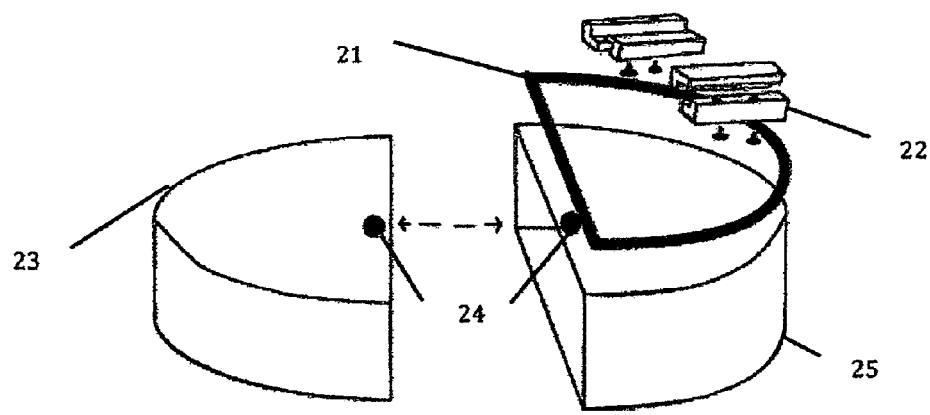
FIG. 4. Is a perspective view of a paper plate storage unit according to a third example embodiment of the present invention, showing the unit in deconstructed view.

13. User installed brackets
14. Magnetic Ring used for holding unit to metallic surfaces
15. Top of unit
16. Side and inside support walls
17. Back of unit
18. Bottom of unit
19. Door hinges used to attach door to assembled unit
20. Door or front of unit FIG. 4. shows a deconstructed view of example 4 of our paper plate storage unit according to a first example embodiment of the present invention.

21. User installed brackets
22. Magnetic Ring used for holding unit to metallic surfaces
23. Left side of unit built slightly smaller than right side, all in one piece meant to slide inside of right side of unit
24. Unit connecting fastener, holds two halves of unit together to give the unit the ability to swivel open and closed.
25. Right side of unit built slightly larger than left side, all in one piece meant to slide over the left side of unit
26. Future unit designs will have an apparatus that allows the paper plates to be dispensed mechanically, and in addition will be constructed in any one of the pliable but sturdy materials available today and in the future (i.e. wood, plastic, polymers, glass, metals, etc.).

All units designs will have at a future date an apparatus that allows the paper plates to be dispensed mechanically.

We claim:

1. A dinnerware storage unit having an open position and a closed position, said dinnerware storage unit comprising:
   (a) a top panel;
   (b) a bottom panel;
   (c) a first convexly curved side panel joined between said top panel and said bottom panel forming an internal compartment, wherein said first side panel has a first end and a second end; and
   (d) a second convexly curved side panel joined between said top panel and said bottom panel, wherein said second convexly curved side panel has a first end and a second end, wherein said first end of said first convexly curved side panel abuts said second end of said second convexly curved side panel and said second end of said first convexly curved side panel abuts said first end of said second convexly curved side panel when said dinnerware storage unit is in said closed position, wherein said second convexly curved side panel is slidable inside said internal compartment and said second convexly curved side panel is parallel to said first convexly curved side panel when said dinnerware storage unit is in said open position.

2. The dinnerware storage unit of claim 1, wherein said first convexly curved side panel is permanently attached to said bottom panel.

3. The dinnerware storage unit of claim 1 further comprising a magnetic ring, wherein said magnetic ring is attached to said top panel.

4. The dinnerware storage unit of claim 1 further comprising at least one mounting bracket, wherein said mounting bracket is attached to said top panel.

\* \* \* \* \*